E. E. JONES.
BELT MANIPULATOR.
APPLICATION FILED AUG. 23, 1913.

1,161,775.

Patented Nov. 23, 1915.
2 SHEETS—SHEET 1.

Witnesses:
H. J. Bull.
B. J. Richards

Inventor
Emerald E. Jones.
By Joshua R. H. Torre
His Attorney.

E. E. JONES.
BELT MANIPULATOR.
APPLICATION FILED AUG. 23, 1913.
1,161,775.
Patented Nov. 23, 1915.
2 SHEETS—SHEET 2.
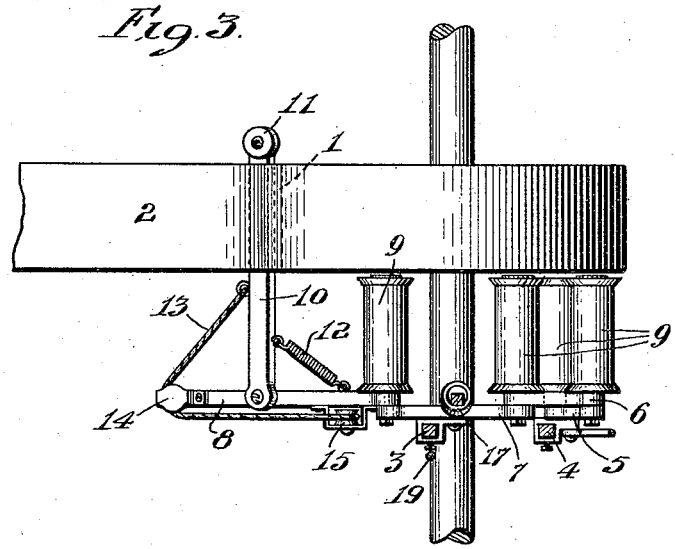
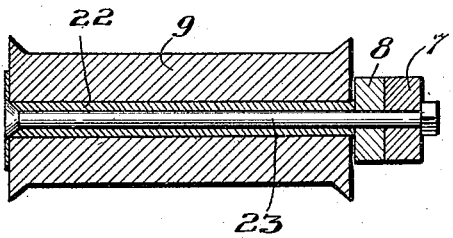
Witnesses:
H. S. Bull
B. J. Richards
Inventor
Emerald E. Jones
By Joshua R. H. Dorr
His Attorney though my above description of method and apparatus details constitutes the preferred form.

UNITED STATES PATENT OFFICE.

EMERALD E. JONES, OF CHICAGO, ILLINOIS, ASSIGNOR TO SURTY GUARD COMPANY, A CORPORATION OF ILLINOIS.

BELT-MANIPULATOR.

1,161,775.

Specification of Letters Patent.  Patented Nov. 23, 1915.

Application filed August 23, 1913. Serial No. 786,252.

*To all whom it may concern:*

Be it known that I, EMERALD E. JONES, a subject of the King of Great Britain, and a resident of the city of Chicago, county of Cook, and State of Illinois, have invented certain new and useful Improvements in Belt-Manipulators, of which the following is a specification.

My invention relates to belt manipulators and has for its object the provision of means for manipulating a belt into and out of operative relation with a pulley whereby said belt may be used advantageously for driving machines not capable of or adapted to be driven by an ordinary tight and loose pulley construction.

A further and particular object of my invention is to provide a device of the class mentioned whereby the same may be adjusted to coöperate with pulleys of various sizes.

The invention consists in the combinations and arrangements of parts hereinafter described and claimed.

Figure 1:
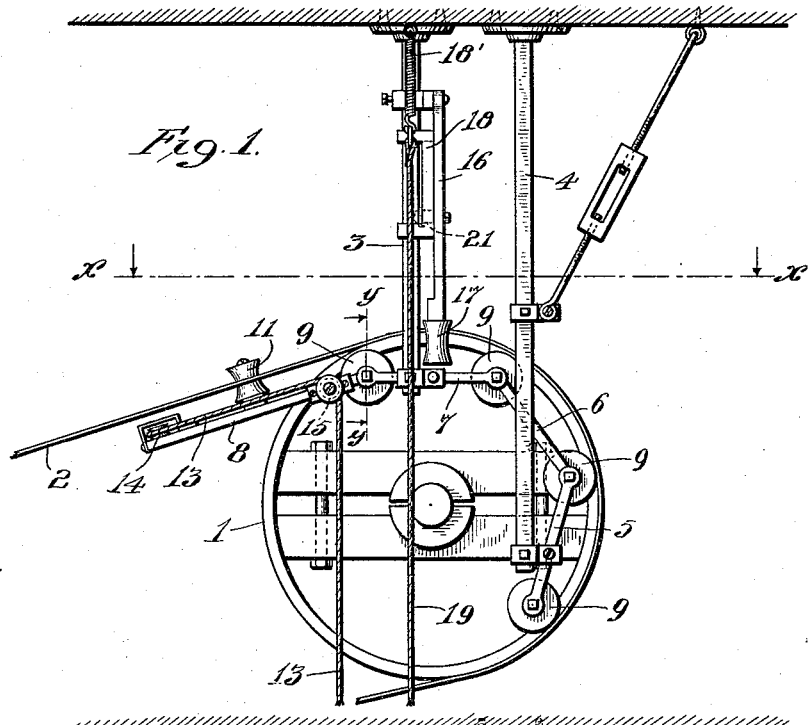
Figure 2:
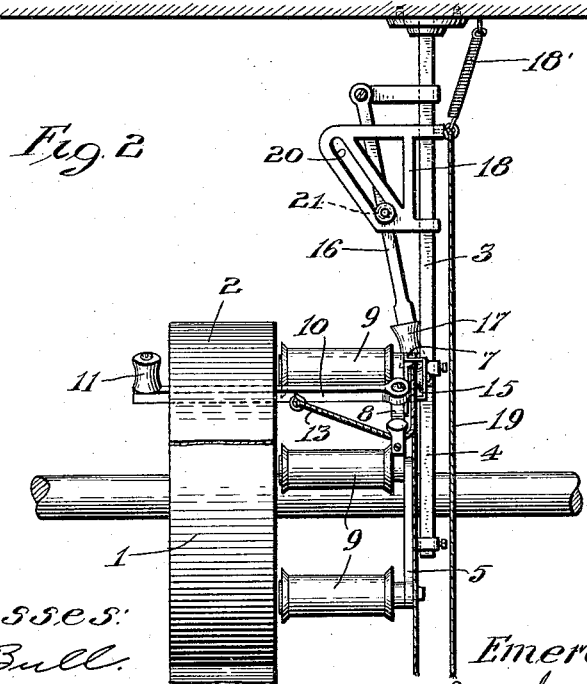

The invention will be best understood by reference to the accompanying drawings forming a part of this specification, and in which, Figure 1 is a side view of a construction embodying my invention, Fig. 2, a view taken at right angles to Fig. 1, Fig. 3, a section taken on line $x$—$x$ of Fig. 1, and Fig. 4, an enlarged section taken on line $y$—$y$ of Fig. 1.

The preferred form of construction as illustrated in the drawings comprises a suitable frame arranged adjacent one side of the driving pulley 1 which is shown as arranged to operate a driving belt 2 in the usual manner. Said frame is composed of depending hangers or bars 3 and 4 and a plurality of angularly disposed pivotally connected bars 5, 6, 7 and 8 secured to said bars in any suitable or desired manner but preferably as shown, wherein the bar 7 is secured to a block 7' and the bar 5 to a block 5', said blocks being mounted for vertical adjustment on the hangers 3 and 4 respectively. By this construction, it is obvious, that by adjusting the blocks 5' and 7' the device may be made to conform to the diameter of the pulley and may be nicely regulated after installation to secure the best results. A plurality of belt supporting rollers 9 are secured to bars 5, 6, 7 and 8 so as to be in positions to receive and support the belt 2 when moved from pulley 1 as will be readily understood. An arm 10 is pivotally mounted on bar 8 and is arranged to swing in a plane under the corresponding portion of belt 2 and substantially parallel therewith, said arm being provided with a contact roller 11 at its outer end adapted to contact with the edge or side of belt 2 and move said belt over onto rollers 9 when arm 10 is properly manipulated. Arm 10 is normally held in retracted position by means of a spring 12 and an operating rope 13 is secured to the other side of said arm and passed thence over guide pulleys 14 and 15 and permitted to hang in position for being operated from the floor. By this arrangement it will be observed that by pulling upon rope 13 the belt 2 may be moved from pulley 1 and over onto supporting rollers 9 and upon release of said rope arm 10 will swing back to initial position under the influence of spring 12.

Another swinging arm 16 is pivotally mounted on hanger 3 and is provided at its lower end with a contact roller 17 adapted to contact with the other side of belt 2 when the same is resting on rollers 9 and move said belt over onto pulley 1 when the arm is properly swung. A member 18 is slidably mounted on hanger 3 and is normally held in elevated position by means of spring 18', a rope 19 being also attached to member 18 for operation thereof. Member 18 is provided with an inclined slot 20 engaging a roller 21 carried by arm 16 and so positioned that upon downward movement of member 18 arm 16 will be swung to cause roller 17 to move belt 2 over onto pulley 1 as explained above. By this arrangement it will be observed that the belt 2 may readily be shifted back onto pulley 1 by merely pulling on rope 19.

The rollers 9 are preferably mounted to rotate on sleeves 22 which are clamped in position by means of bolts 23 which pass through the joints between the corresponding bars of the frame, said bolts thus serving to also secure said bars together.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

In combination with a pulley and belt, of hangers, a plurality of bars having their ends overlapped, pins passing through and securing the overlapping ends of said bars together, rollers journaled on said pins, blocks secured to the two end bars and adjustably mounted on said hangers and means for moving said belt on to and off of said rollers.

In testimony whereof I have signed my name to this specification in the presence of two subscribing witnesses.

EMERALD E. JONES.

Witnesses:
JOSHUA R. H. POTTS,
B. G. RICHARDS.

Copies of this patent may be obtained for five cents each, by addressing the "Commissioner of Patents, Washington, D. C."